Dec. 29, 1953  A. STADLER  2,664,263
GAS COCK
Filed April 20, 1949
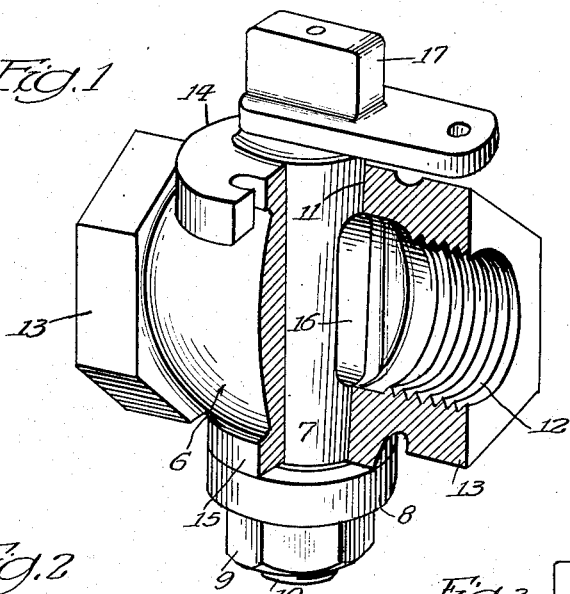
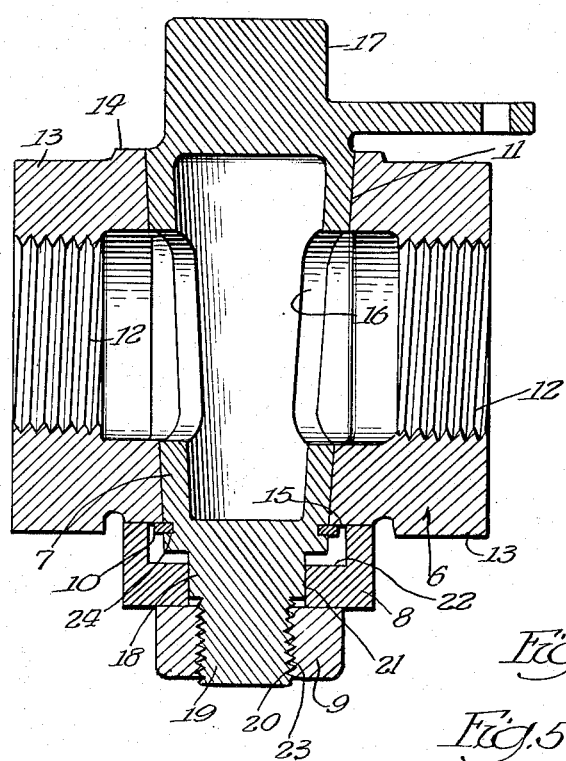
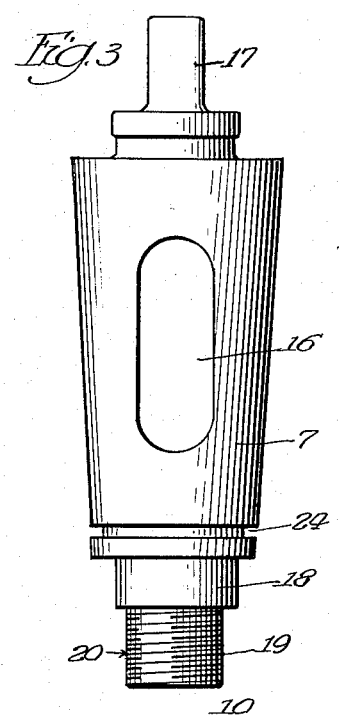
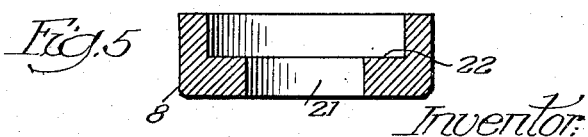
Inventor:
Albert Stadler
By: Theod Gerlach Atty.

Patented Dec. 29, 1953

2,664,263

UNITED STATES PATENT OFFICE 2,664,263

GAS COCK

Albert Stadler, Rockford, Ill., assignor to Eclipse Fuel Engineering Co., Rockford, Ill., a corporation of Illinois Application April 20, 1949, Serial No. 88,625

1 Claim. (Cl. 251—91)

The present invention relates generally to cocks. More particularly the invention relates to that type of cock which serves as an instrumentality or medium for controlling and regulating the flow of gas under pressure in a pipe system and as its parts comprises: (1) an elongated hollow body which has open internally threaded ends for connection to the ends of pipe sections in the system, is provided on the central portion thereof with diametrically opposite outwardly extending circular bosses with flat end surfaces, and embodies a transversely extending tapered bore with the ends thereof extending centrally through the bosses; and (2) a tapered plug which is mounted rotatably in the bore, embodies a crossport for establishing communication between the ends of the body, is provided at its large end with a polygonal head whereby it may be gripped by a wrench in connection with turning thereof into and out of its open position, embodies at its small end a reduced exteriorly disposed screw threaded stem and is maintained in place within the bore by a washer and nut on the stem.

In practice it has been found that a gas cock of the aforementioned type is subject to the objection that if the nut is tightened to an extent beyond the safe limit the stem fractures at its point of connection with the small end of the tapered plug or the screw thread connection between the nut and the stem breaks. If the stem fractures or the screw thread connection between the nut and stem breaks while the plug is in its open position the pressure of the gas within the body ejects the plug from its bore, thus resulting in escape of gas from the pipe system in which the cock is employed. Ejection of the plug is directly attributable to the fact that the surface of the plug that defines the portion of the crossport that is adjacent the large end of the plug is of greater area than the surface of the plug that defines the portion of the crossport that is adjacent the small end of the plug.

The principal object of this invention is to provide a gas cock which is an improvement upon, and obviates the objection to, conventional or standard gas cocks by reason of the fact that it includes simple and novel means whereby the plug is positively precluded from being ejected from the body in the event that the retaining nut is tightened to such an extent as to cause fracture of the reduced stem or breaking of the screw thread connection between the nut and the stem. In general such means comprises a flat, split retaining ring, the inner portion of which is seated in an annular groove in the small end of the rotatably mounted tapered plug and the outer portion of which bears against the flat outer end surface of the adjacent boss and coacts therewith to prevent axial or longitudinal displacement of the plug in the direction of its large end while at the same time permitting the plug freely to rotate within its bore.

Another object of the invention is to provide a gas cock of the last mentioned type and character in which the washer has in its inner end an annular internal recess which receives or accommodates the outer portion of the split retaining ring constituting the means for preventing ejection or removal of the plug from the cock body in the event that the washer engaging nut is so unduly tightened that it results in fracture of the reduced screw threaded stem on the small end of the plug or breaking and stripping of the screw thread connection between it and the stem.

A further object of the invention is to provide a gas cock which is generally of new and improved construction, efficiently and effectively fulfills its intended purpose and, due to inclusion of the split retaining ring on the small end of the plug, is safe to use in a pipe system for noxious gas under pressure.

Other objects of the invention and the various advantages and characteristics of the present gas cock will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like numerals of reference denote corresponding parts throughout the several views:

Figure 1 is a perspective of a gas cock embodying the invention, certain parts being broken away and other parts being shown in section for purposes of illustration;

Figure 2 is a vertical longitudinal section showing in detail the internal design and construction of the body and plug and illustrating the manner in which the flat split retaining ring at the lower end of the small end of the plug coacts with the adjacent boss on the central portion of the body to hold the plug against ejection from its bore;

Figure 3 is an elevation of the plug of the cock;

Figure 4 is a side view of the split retaining ring; and

Figure 5 is a section of the recessed washer which, together with the nut on the reduced screw threaded stem on the small end of the plug, serves normally to retain or clamp the plug in place in its bore in the body of the cock.

The cock which is shown in the drawing constitutes the preferred form or embodiment of the invention. It is primarily designed or adapted for use in a pipe system (not shown) for gas under pressure and serves to regulate or control the flow of gas through the system. As its parts the cock comprises a body 6, a plug 7, a washer 8, a nut 9, and a plug retaining ring 10. The body 6 of the gas cock is in the form of a one-piece metallic casting and, as shown in Figures 1 and 2, is elongated horizontally. It is essentially hollow and embodies open ends and a transverse bore 11 between its ends. The ends of the body have internal screw threads 12 whereby the cock may be connected to adjacent ends of pipe sections in the pipe system in which it is employed. The ends of the cock body 6 are also provided with polygonal, outwardly extending flanges 13 whereby the body may be gripped by a wrench in connection with connection thereof to the aforesaid pipe sections. On its central portion the cock body 6 is provided with an upper circular boss 14 and a lower circular boss 15. These bosses are arranged diametrically opposite one another and are machined or otherwise processed so that the outer end surfaces thereof are flat. As shown in the drawing, the two bosses 14 and 15 are located directly inwards of the polygonal outwardly extending flanges 13 at the ends of the body. The tapered bore 11 extends vertically through the body and is arranged so that the large end thereof intersects or extends through the central portion of the upper boss 14 and its small end extends through or intersects the central portion of the lower boss 15.

The plug 7 is tapered conformably to, and fits rotatably in, the tapered bore 11 and has in its central portion a crossport 16. When the plug 7 is positioned as shown in Figure 2 the crossport 16 effects communication between the open ends of the cock body 6 and when the plug is rotated at right angles, i. e., throughout an arc of 90°, the crossport 16 is out of communication with the open ends of the cock body and the cock is in its closed position. The upper or large end of the plug is provided with an externally disposed polygonal head 17 in order that a wrench may be applied to it when it is desired to turn the tapered plug 7 so as to close or open the cock as a whole. It will be noted from Figure 2 of the drawing that because the plug is downwardly tapered the surface of the plug that defines the upper portion of the crossport 16 is of greater area than the surface of the plug that defines the lower portion of the crossport. Because of this the gas under pressure which is disposed within the crossport when the plug is in its open position tends to eject or urge the plug axially in the direction of its large end. The lower or small end of the plug projects a comparatively small distance beyond or beneath the flat outer end surface of the lower boss 15 and is provided with a reduced substantially cylindrical extension 18 and a reduced stem 19. The extension and stem are integral parts of the plug. The stem 19 is of smaller diameter than the cylindrical extension 18 and has a male or external screw thread 20.

The washer 8 surrounds the reduced cylindrical extension 18 on the small end of the cock plug 7 and coacts with the nut 9 to clamp the plug within the tapered bore 11. It is formed of any suitable metal and has a centrally disposed substantially circular hole 21 which is substantially the same in diameter as the extension 18. The hole defining portion of the washer 8 engages slidably the extension to the end that the washer and extension are capable of being shifted axially one relatively to the other. The inner end of the washer 8 has formed therein an annular, internal recess 22 which is of greater diameter and depth than, and serves loosely to house or accommodate, the portion of the small end of the plug that projects downwards beyond the flat end surface of the lower boss 15. As shown in Figure 2, the external diameter of the washer is approximately the same as the diameter of the lower boss 15 and the inner end surface of the washer abuts flatly against the outer end surface of the boss. The height or length of the washer is greater than the combined length of the cylindrical extension 18 and the projecting end portion of the small end of the plug in order that the lower or outer end surface of the washer is disposed outwards of, or at a lower level than, the outer end surface of the extension.

The nut 9 surrounds the reduced stem 19 and has an internal or female screw thread 23 in threaded relation with the screw thread 20 on the stem. The height or length of the nut is less than the screw threaded stem 19 and the inner end surface of the nut abuts against the outer end surface of the washer. When the nut is tightened it serves to jam the washer into firm abutment with the flat outer end surface of the boss 15 and draws the tapered plug 7 downwards into firm seated relation with the tapered transverse bore 11 in the central portion of the cock body 6.

The plug retaining ring 10 serves positively to prevent ejection of the plug from the bore in the event that the nut 9 is accidentally removed from the reduced screw threaded stem 20 or is so unduly tightened that it causes either the stem to fracture at its point of connection with the outer end of the reduced cylindrical extension 18 or breakage and stripping of the screw thread connection between the nut and the stem on which it is mounted. It has flat end surfaces and extends throughout an arc of approximately 360°. The inner portion of the ring 7 is seated within an annular groove 24 in the portion of the small end of the plug that projects beyond the flat end surface of the boss 15. The groove 24 is of U-shaped cross section and so arranged or positioned that its inner side is flush with the end surface of the lower boss 15. The outer portion of the ring 10 bears flatly against the outer end surface of the lower boss and coacts therewith positively to prevent axial or longitudinal displacement of the plug 7 in the direction of its large end while at the same time permitting the plug freely to rotate within the bore 11. The ring is disposed within the annular internal recess 22 in the inner end of the washer 8 and hence when the cock is in its fully assembled position no part of it is exposed. As shown in Figure 2 of the drawing the outer portion of the ring 10 is spaced inwards of the outer peripheral portion of the annular recess 22 and hence it does not interfere with the inner end of the washer engaging the outer end surface of the lower boss when the washer is clamped in place by the nut 9. The plug retaining ring 10 is formed of any suitable hard resilient metal stock.

In assembling the cock the plug 17 is inserted lengthwise into the bore 11 and is shifted towards its small end until it is firmly seated within the bore. Thereafter the ring 18 is expanded in any suitable manner and is slid onto the portion of the small end of the plug that projects beyond the flat outer end surface of the lower boss 15. As soon as the ring is slid into alignment or coplanar relation with the annular groove 24 it automatically contracts, due to its inherent resiliency, until its inner portion is firmly seated within the recess and its outer portion is in abutment with the end surface of the lower boss 15. As soon as the ring is in place it serves, as heretofore pointed out, positively to prevent axial displacement of the plug in the direction to its large end. After the plug retaining ring is mounted in place the washer 8 is slid onto the cylindrical extension 18 and the nut 9 is applied to the reduced screw threaded stem 19. Upon tightening of the nut the washer is jammed against the lower boss 15 and the plug is clamped within its correspondingly tapered bore 11. By applying a wrench or other suitable turning tool to the polygonal head 17 on the large end of the plug the plug may be turned into its open or closed position or any intermediate position.

The hereindescribed gas cock may be safely used in any pipe system for noxious gas and this is directly attributable to the fact that the plug thereof is precluded by the retaining ring 10 from being ejected from the body in the event the nut 9 is accidentally or otherwise removed from the stem or is unduly tightened to such an extent as to cause fracture of the stem or stripping of the screw thread connection between it and the stem. Because of the fact that the retaining ring 10 is simple in design and may be readily manipulated into place the cock as a whole may be produced at a comparatively low cost and also assembled with facility.

Whereas the cock has been described as being for use in connection with a pipe system for gas under pressure it may be used equally as well in a system for liquid under pressure. It is also to be understood that the invention is not to be understood as restricted to the details set forth since these may be modified within the scope of the appended claim without departing from the spirit and scope of the invention.

Having thus described the invention what I claim as new and desire to secure by Letters Patent is:

As a new article of manufacture, a cock comprising an elongated hollow body provided with openings in the ends thereof, having on the central portion thereof a circular externally disposed boss with a flat outer end surface, and embodying in its central portion a transverse tapered bore with the small end thereof extending through the central portion of the boss and its central portion in communication with said openings, a plug tapered conformably to, and fitting rotatably within, the bore, embodying a cross-port for establishing communication between said openings in the ends of the body when the plug is turned into a particular position, provided at its large end with exteriorly disposed turning means, having its small end projecting a small distance beyond the end surface of the boss and provided with an angular groove directly opposite said end surface and of U-shaped cross section, and embodying on its small end a concentric reduced cylindrical extension and a concentric screw threaded stem outwards of, and of less diameter than, the extension, a washer of substantially the same external diameter as the boss and of slightly greater depth than the combined depth of the projecting small end of the plug and the extension mounted slidably on the extension and having the inner end thereof abutting flatly against the end surface of the boss and provided with an internal annular recess which is of greater diameter and depth than, and serves loosely to house, said projecting small end of the plug and surrounds the groove in said small end of the plug, a nut mounted on the stem and adapted when tightened to clamp the washer in place, and a split ring disposed within and housed entirely by, the recess in the washer, having its inner portion seated within said annular groove and its outer portion abutting against the end surface of said adjacent boss, and adapted positively to hold the plug against axial displacement in the direction of its large end in the event of loosening of the nut or fracture of the stem.

ALBERT STADLER.

References Cited in the file of this patent

UNITED STATES PATENTS

| Number | Name | Date |
|---|---|---|
| 231,283 | Cushing | Aug. 17, 1880 |
| 334,722 | Polle | Jan. 19, 1886 |
| 1,461,520 | Forman | July 10, 1923 |
| 1,561,867 | Larsen | Nov. 17, 1925 |
| 1,820,587 | Winship | Aug. 25, 1931 |
| 2,053,072 | Farmer | Sept. 1, 1936 |
| 2,138,767 | Matthews | Nov. 29, 1938 |
| 2,552,376 | Haun | May 8, 1951 |
| 2,599,774 | Ohls | June 10, 1952 |

FOREIGN PATENTS

| Number | Country | Date |
|---|---|---|
| 194,642 | Great Britain | of 1908 |
| 80,121 | Switzerland | of 1916 |